Dec. 15, 1970     SUGURU SATO     3,548,226

ALTERNATING-CURRENT GENERATOR WITH OPEN-ENDED HOUSING

Filed March 5, 1969     3 Sheets-Sheet 1

INVENTOR
Suguru SATO
BY his ATTORNEY

INVENTOR
Suguru SATO
BY
Michael C. Sneiker
his ATTORNEY

United States Patent Office 3,548,226
Patented Dec. 15, 1970

3,548,226
ALTERNATING-CURRENT GENERATOR WITH OPEN-ENDED HOUSING
Suguru Sato, Banchi, Japan, assignor to Nippon Denso Co., Ltd., Kariya, Aichi, Japan
Filed Mar. 5, 1969, Ser. No. 804,475
Claims priority, application Japan, Mar. 5, 1968, 43/14,155
Int. Cl. H02k 11/00
U.S. Cl. 310—68
15 Claims

ABSTRACT OF THE DISCLOSURE

An A-C generator having a cupped housing whose bottom wall constitutes an end frame and accommodates a ball bearing for a driven inductor shaft. A needle bearing for the shaft is mounted in a yoke which carries the exciter coil and is bolted to the end frame. The A-C winding is mounted in recesses provided in a laminated stator fixed to the internal surface of the cylindrical wall of the housing. A rectifier unit is carried by conductors and posts which establish a mechanical connection with the stator and an electrical connection with the winding.

BACKGROUND OF THE INVENTION

The present invention relates to alternating-current generators in general, and more particularly to improvements in generators which can be utilized in automotive vehicles, for example, as a means for supplying current to the lighting system.

In certain presently known A-C generators for automotive vehicles, the housing includes a tubular central portion and two end frames. The polyphase winding and the exciter coil are stationary. An inductor of soft iron rotates between the coil and the winding to conduct magnetic force lines of the flux which is produced by the exciter current. The inductor is mounted on a shaft which is driven by a pulley mounted thereon adjacent to the outer side of the drive end frame. The shaft rotates in two ball bearings each of which is mounted in one of the end frames. A drawback of such generators is that they are expensive, bulky and require substantial exciting currents because the inducing magnetic flux must traverse four air gaps.

SUMMARY OF THE INVENTION

An object of the invention is to provide an alternating-current generator which need not utilize brushes or slip rings and which is lighter, more compact and simpler than presently known generators with the same output.

Another object of the invention is to provide a novel housing, a novel built-in rectifier unit and a novel bearing system for the inductor shaft in an A-C generator.

A further object of the invention is to provide novel mechanical and electrical connections for the built-in rectifier unit of the above outlined generator.

An additional object of the invention is to provide a generator wherein the axial length of the housing is substantially less than the length of the housing in an equivalent conventional A-C generator.

Still another object of the invention is to provide a generator wherein the magnetically effective parts are distributed and cooperate in a novel and improved way.

The improved A-C generator comprises a cupped housing whose open end is preferably closed by a built-in disk-shaped rectifier unit and whose bottom wall constitutes a single end frame and accommodates a ball bearing for the inductor shaft which is driven by a pulley or the like. A second bearing, preferably a needle bearing, for the inductor shaft is mounted in an annular yoke which is bolted to the end frame in the interior of the housing and carries a stationary exciter coil. A stationary A-C winding is mounted in open-sided recesses provided therefor in a laminated stator which is affixed to the cylindrical wall of the housing and surrounds with small clearance a soft iron inductor core assembly which is driven by the shaft.

The novel features which are considered as characteristic of the invention are set forth in particular in the appended claims. The improved generator itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
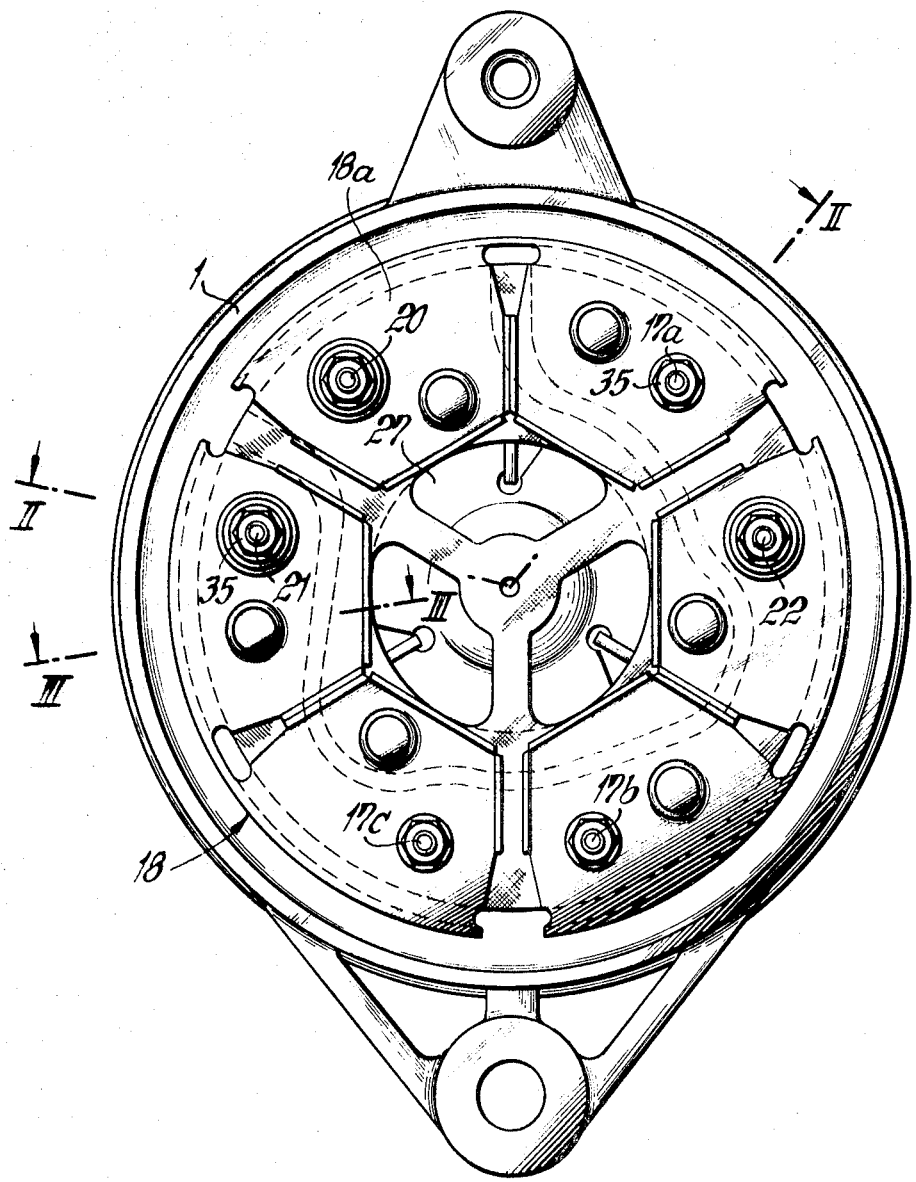
FIG. 1 is a rear elevational view of an alternating-current generator which embodies the present invention.
Figure 2:
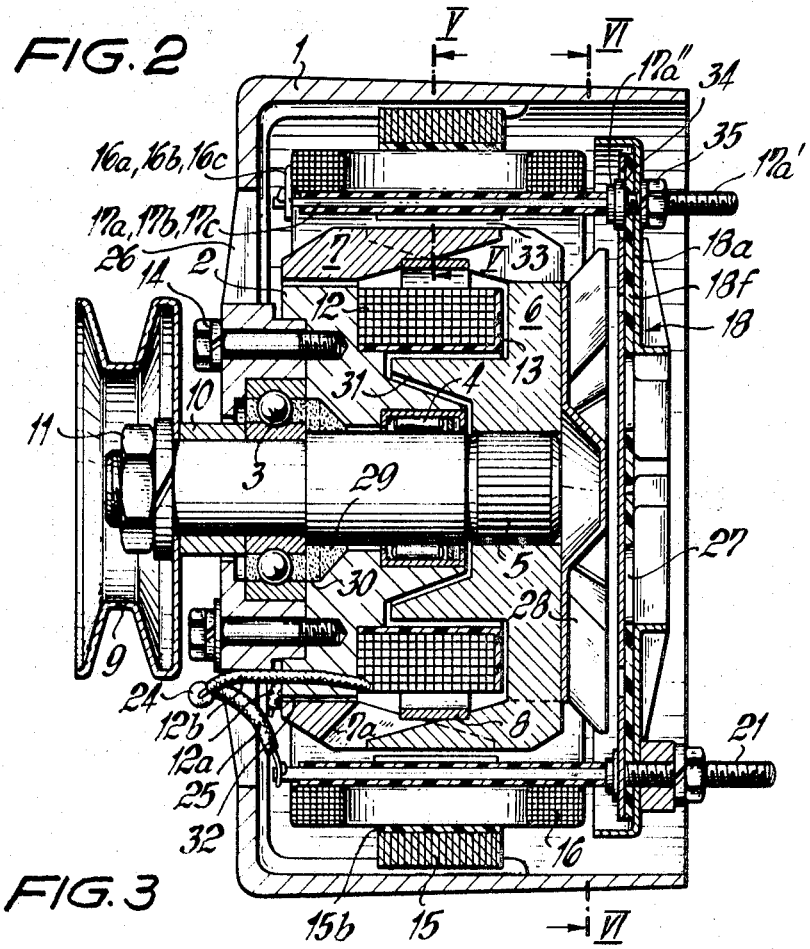
FIG. 2 is a sectional view of the generator as seen in the direction of arrows from the line A—A of FIG. 1.

The generator of FIGS. 1 and 2 comprises a cupped housing 1 which consists of nonmagnetic material. The bottom wall 1a of this housing constitutes a single end frame and accommodates a main antifriction bearing here shown as a radial ball bearing 3. The end frame 1a is rigidly connected with an annular yoke 2 which constitutes an internal hub of the housing and includes a ring-shaped flange 2a adjacent to the end frame and a conical portion 2b remote from the bearing 3. The conical portion 2b is formed with a counterbore for a second antifriction bearing here shown as a needle bearing 4. The bearings 3 and 4 surround a driven inductor shaft 5 which carries two claw-shaped ferrous inductor cores 6 and 7 adjacent to the bearing 4. These cores are rigidly connected to each other by a nonmagnetic ring 8. The core 6 is a press-fit on the inductor shaft 5. The outer end portions of claws on the core 7 are of triangular cross-sectional outline and are provided with inclined guide surfaces 7a for cooling air. The shaft 5 is driven by a pulley 9 which is outwardly adjacent to the end frame 1a and is fixed to the shaft by a nut 11. This nut presses one flange of the pulley 9 against a distancing ring 10 which surrounds the shaft 5 and abuts against the inner race of the bearing 3. The inner race abuts against an annular shoulder of the shaft 5.

The exciter or field coil 12 of the generator is convoluted around an annular spool or holder 13 of insulating material. The coil 12 is accommodated in the space defined by the cores 6, 7 but is out of contact therewith. The holder 13 is mounted on the iron yoke 2. The aforementioned flange 2a of the yoke 2 extends radially outwardly beyond the exciter coil 12 and holder 13; this flange is secured to the end frame 1a by several threaded bolts 14 or analogous fasteners.

Figure 5:
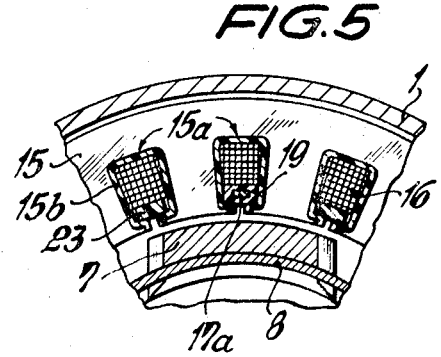
FIG. 5 is a fragmentary sectional view as seen in the direction of arrows from the line C–C' of FIG. 2.
Figure 4:
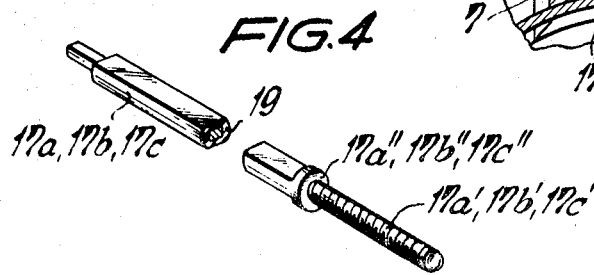
FIG. 4 is a fragmentary partly sectional perspective view of a conductor in the generator of FIG. 1.
Figure 6:
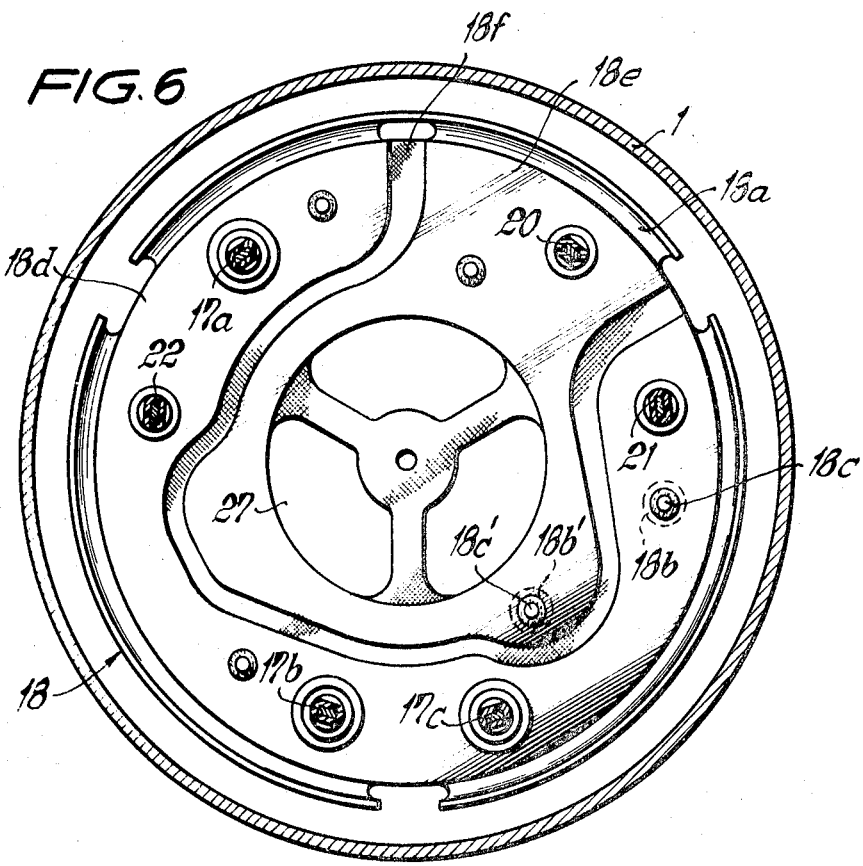
FIG. 6 is a sectional view as seen in the direction of arrows from the line D–D' of FIG. 2.

The interior of the housing 1 further accommodates a stator package 15 of metallic sheet laminations having open-sided recesses or notches 15a for a star-shaped polyphase winding 16. These recesses are best shown in FIG. 5. Each portion of the winding 16 is surrounded by an insulating sheath 15b. Such sheaths preferably form layers or liners which are applied to surfaces surrounding the respective recesses. The terminals 16a, 16b, 16c of the polyphase winding 16 extend from the recesses 15a in a direction toward the end frame 1a (see FIG. 2) and are connected to smaller-diameter ends of specially configured elongated wedge-like conductors 17a, 17b, 17c. FIG. 4 shows the configuration of one of these conductors. The median portion of each conductor extends into one of the recesses 15a in the package 15, and such median portion is surrounded by a tubular insulator 19 of epoxy resin or the like. The second ends of the conductors 17a-17c are respectively provided with threads 17a', 17b', 17c' to facilitate connection to a rectifier unit 18. The insulators 19 are separated from the respective threads by flanges or collars 17a'', 17b'', 17c''. Both ends of each conductor 17 extend beyond the stator package 15.

Figure 3:
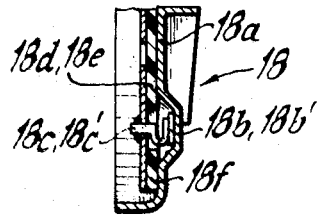
FIG. 3 is a fragmentary sectional view as seen in the direction of arrows from the line O–B of FIG. 1.

The rectifier unit 18 forms a circular disk which is inserted into the open end of the housing 1. Its diameter is somewhat less than the internal diameter of the housing (see FIG. 2). This rectifier unit 18 comprises several rectifier elements 18b, 18b' which are shown in FIG. 3. These elements are mounted on three sector-shaped main cooling ribs 18a of sheet metal which are provided on the unit 18 and each of which supports a rectifier element 18b and a rectifier element 18b' of opposite polarity. The outwardly extending contacts 18c, 18c' of rectifier elements 18b, 18b' are connected to auxiliary cooling ribs 18d, 18e. These auxiliary cooling ribs establish electrical connections between the corresponding rectifier elements. The ribs 18d, 18e are bonded to a plate-like insulating board 18f which is bonded to the main cooling ribs 18a and extends at right angles to the axis of the shaft 5.

Direct current is taken off at a positive generator terminal 20 and at a negative generator terminal 21. These terminals are posts which are fixed to the rectifier unit 18. A further post 22 is provided for connection of the field coil 12. Each of the posts 20-22 is similar to one of the conductors 17a, 17b, 17c and each thereof has a tubular insulator surrounding that portion which extends into one of the recesses 15a in the package 15. The remaining recesses 15a receive additional posts 23 (FIG. 5) which consist entirely of insulating material and serve only as a means for closing or sealing the respective recesses. The conductors 17a, 17b, 17c and posts 20-23 thus serve as a means for retaining the windings 16a-16c in the corresponding recesses 15a. These parts also serve to rigidly support the rectifier unit 18. The connection is established by means of nuts 35 which mesh with the threads 17a'-17c' of conductors 17a-17c and with similar threads provided on the posts 20-23. Each of the conductors 17a-17c is electrically connected with one of the main cooling ribs 18a. The plus post 20 is connected with one of the auxiliary cooling ribs 18e and the minus post 21 is connected with one of the auxiliary cooling ribs 18d. The conductor 17a further serves as an A-C connector for the rectifier unit 18. The post 22 is connected with the plus terminal 12a of the coil 12; the minus terminal 12b of this coil is connected with the grounded terminal 24 on the end frame 1a of the housing 1. The terminal 24 is electrically connected with the post 21 by a conductor wire 25.

The end frame 1a is formed with a window 26 and the rectifier unit 18 is provided with a second window 27. A centrifugal fan 28 is located behind the unit 18 and is affixed to the exposed side of the core 6. This fan draws cooling air through the window 27 and expels such air through the window 26.

The bearings 3 and 4 receive lubricating grease 29 by way of a channel 30. The numerals 31 and 32 denote air gaps between the yoke 2 and cores 6, 7. A further air gap 33 is provided between the cores 6, 7 and the package 15.

FIG. 2 shows a metallic washer 34 which is inserted between the collars of posts 20-22 and the ribs of the rectifier unit 18. The purpose of this washer is to reduce the pressure upon the auxiliary ribs 18d, 18e in response to tightening of nuts 35 on the conductors 17a-17c and posts 20-22.

Figure 7:
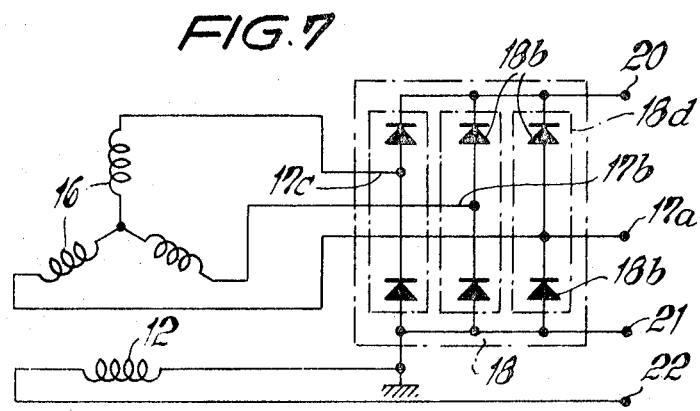
FIG. 7 is a diagrammatic view of the electric circuit of the generator.

The operation:

The post 22 is connected with an energy source, for example, with the battery of an automotive vehicle. When a current flows through the exciter coil 12, there develops a magnetic flux in the following way: a small portion of the flux passes from the yoke 2 through the needle bearing 4 and shaft 5 to the iron core 6. The major part of the flux passes across the air gap 31 directly to the core 6. From the core 6, the flux continues across the air gap 33, through the package 15 and its winding 16 and back across the air gap 33, through the core 7 and across the air gap 32 to the yoke 2. Since the diameter of the needle bearing 4 in the yoke 2 is smaller than the diameter of the ball bearing 3, the generator provides a large cross-sectional area for passage of magnetic force lines to the inductor shaft 5. Furthermore, and since the contact between the rolling elements and the races of the bearing 4 is linear, the magnitude of the total magnetic flux from the yoke 2, across the air gap 31, through the needle bearing 4 and shaft 5 and to the core 6 exceeds the magnitude of the flux if the bearing 4 is replaced with a ball bearing. Since the cores 6, 7 rotate with the driven shaft 5, the magnetic flux which passes through the winding 16 is converted into a polyphase flux to generate in the winding a three-phase voltage. The conductors 17a-17c convey such voltage to the rectifier unit 18 to be subjected to dual rectification (see FIG. 7) so that the potential between the posts 20, 21 is a D-C voltage.

The core 6 drives the fan 28 which causes a current of air to flow from the window 27 of the rectifier unit 18 in the direction indicated by arrow a (FIG. 2), along the cores 6, 7 (i.e., through the interior of the generator), along the inclined guide surfaces 7a of the core 7, against the components of the winding 16 and toward and through the window 26. Thus, such current of air cools the rectifier unit 18, the coil 12 and the winding 16. The unit 18 serves as an effective means for preventing penetration of dust, moisture or other foreign matter into the interior of the housing 1.

It is also within the purview of my invention to connect the rectifier unit 18 directly to the end frame 1a, i.e, this unit need not be connected with the package 15. Furthermore, the fan 28 can be mounted on or made integral with the pulley 9. For example, the fan 28 can be inserted between the end frame 1a and pulley 9 and is ready to be driven by the shaft 5 in response to tightening of the nut 11.

An important advantage of the improved generator is that its housing need not include two end frames. This is achieved by replacing the customary second main bearing for the shaft by a smaller needle bearing which is installed directly in the yoke of the generator. Furthermore, the needle bearing can be accommodated in a small-diameter bore, i.e., in a bore whose diameter is smaller than that required to accommodate an equivalent ball bearing. Since the rolling elements of the needle bearing are in linear contact (rather than in point contact) with the adjoining races, a larger cross-sectional area is available for the passage of magnetic flux through the yoke 2 and a greater cross-sectional area is available for passage of magnetic flux from the yoke 2 to the cores 6 and 7 to thus raise the output of the generator.

As stated before, the disk-shaped rectifier unit 18 performs an important secondary function, namely, it acts not unlike a cover or closure for the open end of the housing 1 and interferes with entry of contaminants or other foreign matter. Such secondary use of the unit 18 contributes to a reduction in axial length, weight and overall dimensions of the generator. This renders the generator suitable for use as a dynamo in automotive vehicles as well as in all other types of machines or apparatus where the space is at a premium.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In an alternating-current generator, a combination comprising a one-piece cupped housing having an open end and including a bottom wall opposite said open end; a rotary driven shaft extending through an opening in said bottom wall into the interior of said housing; a first antifriction bearing mounted in said bottom wall and supporting said shaft; inductor core means provided on said shaft in the interior of said housing; an annular stationary iron yoke fixed to said bottom wall of said housing and surrounding a portion of said shaft; and a second antifriction bearing provided in said yoke and supporting said shaft spaced from said first antifriction bearing.

2. A combination as defined in claim 1, wherein said second bearing is adjacent to said inductor core means.

3. A combination as defined in claim 1, further comprising a stationary excitor coil mounted on said yoke adjacent to said inductor core means.

4. A combination as defined in claim 3, further comprising stationary A-C winding means mounted on said housing outwardly adjacent to said core means.

5. A combination as defined in claim 1, wherein said second antifriction bearing is a needle bearing.

6. A combination as defined in claim 1 and further comprising a rectifier unit carried by and located at the open end of said housing, said unit comprising a board of insulating material.

7. A combination as defined in claim 1, further comprising a rectifier unit supported by said housing in said open end thereof and including a plurality of substantially sector-shaped cooling members and a pair of rectifier elements mounted on each of said cooling members.

8. A combination as defined in claim 7, wherein said unit further comprises an insulating board extending substantially at right angles to the axis of said shaft and adjacent to one side of each of said cooling members, said rectifier elements being provided at said one side of each of the respective cooling members.

9. A combination as defined in claim 1, further comprising a stationary laminated stator provided with recesses, an A-C winding having portions received in said recesses, a rectifier unit, and conductor means extending into some of said recesses and supporting said unit.

10. A combination as defined in claim 9, wherein said conductor means are posts which seal the open sides of the respective recesses and further comprising additional posts sealingly received in the open sides of remaining recesses and supportingly connected with said unit.

11. A combination as defined in claim 9, wherein each of said conductor means comprises an elongated portion of current-conducting material having a first end and a second end, said first ends being electrically connected with the respective portions of said winding and said second ends being electrically connected with said unit, each of said conductor means further comprising a tubular insulator surrounding the respective elongated portion between said ends thereof and sealingly received in the open side of the respective recess.

12. A combination as defined in claim 11, wherein the ends of said elongated portions extend beyond said stator.

13. A combination as defined in claim 9, further comprising current-conducting posts having insulated portions sealingly received in open sides of at least some of the remaining recesses in said stator, said posts having current-conducting ends extending beyond said stator.

14. A combination as defined in claim 13, wherein said posts include a postive generator post and a negative generator post.

15. A combination as defined in claim 1, further comprising means driven by said shaft for circulating air in the interior of said housing.

References Cited

UNITED STATES PATENTS

| | | | |
|---|---|---|---|
| 2,588,175 | 3/1952 | Stewart et al. | 310—263X |
| 3,215,878 | 11/1965 | Woodward | 310—168X |
| 3,283,191 | 11/1966 | Carruth | 310—263X |
| 3,290,525 | 12/1966 | Sudmeier | 310—153 |
| 3,312,844 | 4/1967 | Juhnke et al. | 310—266X |
| 3,484,635 | 12/1969 | MacKallor | 310—266 |
| 3,493,800 | 2/1970 | Barrett | 310—67X |
| 3,134,039 | 5/1964 | Bosch | 310—263X |
| 3,252,025 | 5/1966 | Brown et al. | 310—263X |
| 3,329,840 | 7/1967 | Binder | 310—68 |
| 3,329,841 | 7/1967 | Binder et al. | 310—68 |

DONOVAN F. DUGGAN, Primary Examiner

U.S. Cl. X.R.

310—89, 168, 214, 263